United States Patent [19]

Tsao et al.

[11] Patent Number: 4,890,412
[45] Date of Patent: Jan. 2, 1990

[54] LIFE-LIKE FISH LURE

[76] Inventors: Thomas K. Tsao, 4441 Discovery Rd., Virginia Beach, Va. 23451; Paul C. Cole, 5404 Chatham Hall Dr., Virginia Beach, Va. 23464

[21] Appl. No.: 279,459

[22] Filed: Nov. 30, 1988

[51] Int. Cl.⁴ .............................................. A01H 85/00
[52] U.S. Cl. .................................................... 43/42.24
[58] Field of Search ................. 43/42.24, 42.39, 42.15, 43/42.1

[56] References Cited

U.S. PATENT DOCUMENTS

| | | | |
|---|---|---|---|
| 3,120,074 | 2/1964 | Messler | 43/42.24 |
| 3,349,513 | 10/1967 | Jeff | 43/42.24 |
| 3,831,307 | 8/1974 | Pittman | 43/42.24 |
| 4,050,181 | 9/1977 | Young et al. | 43/42.24 |
| 4,214,396 | 7/1980 | Firmin | 43/42.1 |

Primary Examiner—M. Jordan
Attorney, Agent, or Firm—Epstein, Edell & Retzer

[57] ABSTRACT

A fish lure, simulating an earthworm or other annelid, includes a clitellum disposed intermediate its ends and eccentrically weighted relative to its central longitudinal axis such that the underside of the lure is weightedly-biased to face downward whenever the lure is in a body of water causing it, when falling to assume a U-shaped, life-like position. A paddle at the tail end of the lure causes the lure to move with a life-like wriggle as it drops through water. A lip proximate the head end of the lure likewise imparts a wriggling motion to the falling lure. The lip may be replaced with a medusa-like collar that opens and closes as the lure is drawn through water by a fishing line that is alternately pulled and relaxed.

28 Claims, 1 Drawing Sheet

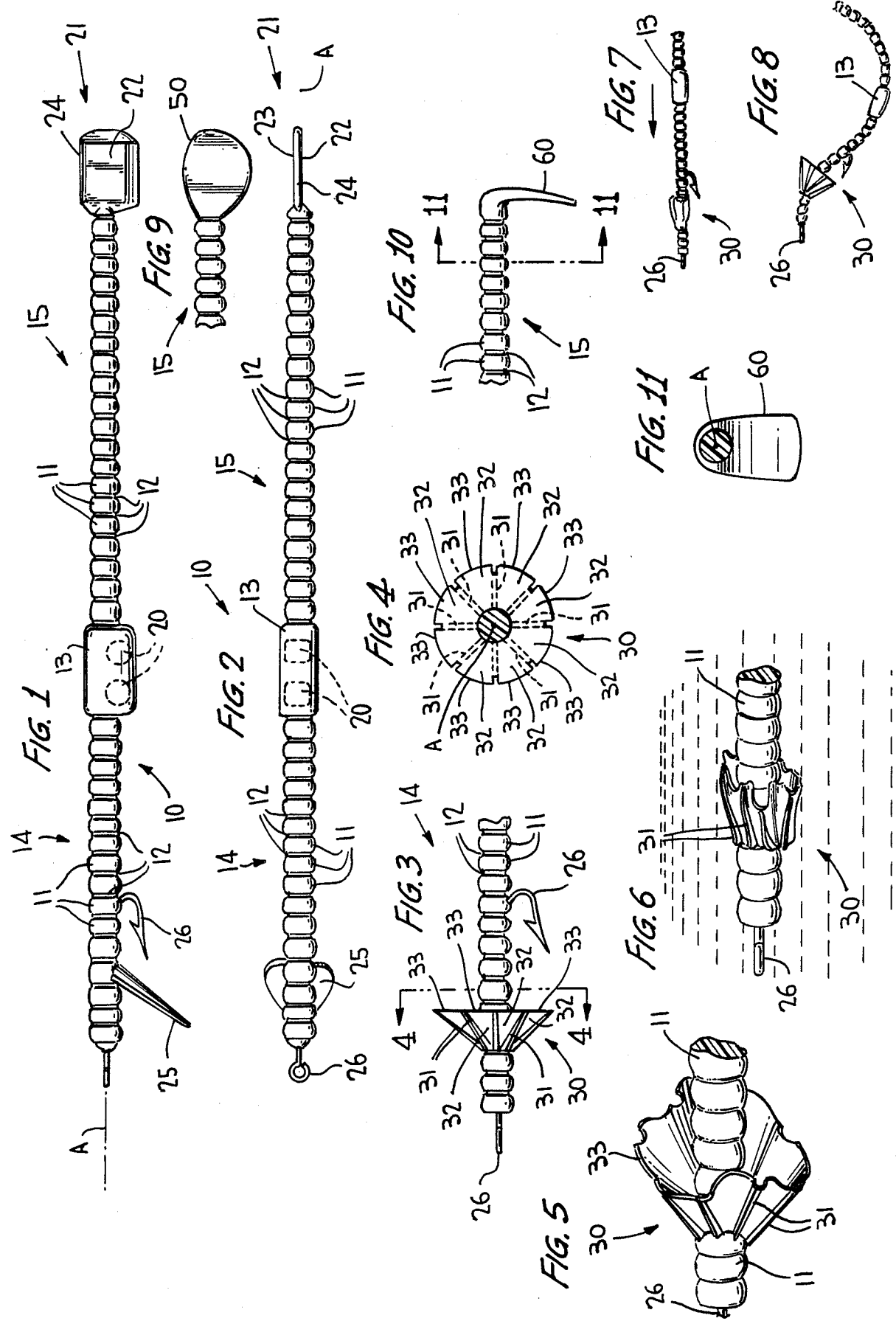

LIFE-LIKE FISH LURE

BACKGROUND OF THE INVENTION

1. Technical Field

The present invention relates to fish lures and, more particularly, to fish lures configured to have the appearance of a worm and to simulate worm-like movements when falling and being drawn through water.

2. Discussion of the Prior Art

As a live earthworm or bloodworm or other annelid falls or drops through a body of water it tends to assume a broad U-shape wherein the weighted clitellum is somewhat lower than the ends of the worm. In addition, the falling worm wriggles and squirms in a characteristic manner. There is virtually no tumbling of the falling worm, nor is there spinning about the longitudinal axis as the worm falls. Dead worms, on the other hand, tend to fall to the bottom of the body of water without significant wriggling or squirming; rather, the dead worms tend to slowly tumble in a random manner depending primarily upon the water currents. After observing the reaction of fish to these phenomena, it became clear to us that fish pay virtually no attention to dead falling worms but aggressively attack and ingest live falling worms. It is only after the live worms have been consumed that the fish bother to feed on the dead worms.

When live worms move through water, they tend to wriggle; in addition, the worms tend to alternately stretch out linearly and then compress into a serpentine posture. This complex movement, including the wriggling and the alternate compression and elongation, also appears to attract feeding fish.

In view of the foregoing, it occurred to us that an ideal fish lure would be a simulated worm that follows the characteristic posture and wriggling and squirming movements of a live worm when falling through water. In addition, when the lure is alternately released and pulled through water from the end of a fishing line it should alternately stretch out and fall back in a wriggling motion, characteristic of a live worm.

It is known in the prior art to provide fish lures that simulate worms, at least in appearance. Some prior art worm-like lures have been purported to have worm-like movements imparted thereto as the lures move through water. For example, in U.S. Pat. No. 2,927,392 (Lievense) there is described a worm-simulating lure that is purported to be capable of assuming sinuous longitudinal twists while drawn through water because of a scoop and weight located at its front end, and further because of a web-like tail. The Lievense patent makes no mention of an attempt to simulate live worm motion when the lure falls through water. Moreover, it is believed that the so-called sinuous twists are merely a waving of the webbed tail rather than a true serpentine configuration alternately assumed by a live worm moving in a body of water.

Another simulated worm fish lure is disclosed in U.S. Pat. No. 4,653,212 (Pixton). A weight is mounted at the head of this lure to assure that the lure orients itself head-downwardly while dropping to the bottom of a body of water. As described above, live worms tend to orient themselves in a broad U-shape, closer to horizontal, when falling through water. The Pixton lure is not designed to attract fish while it is falling through water; rather, it is tended to attract fish when at rest in weeds, or the like, at the bottom of a pond or lake.

U.S. Pat. No. 4,660,318 (Mieno) relates to a worm-like fish lure having a spinner-blade at its head end with a weighted keel at the rear portion of the spinner-blade. The combination is said to impart a swimming-like or oscillatory motion to the lure when pulled through water. The patent provides no mention of any simulated worm-like movement when the lure falls through a body of water. In addition, the disclosed spinner-blade and keel distract from the overall worm-like appearance of the lure.

U.S. Pat. No. 3,248,820 (Lamar) discloses a deflecting plate secured to the front end of a worm-type lure, the plate being configured to impart sinuous movement to the lure when the combination is pulled through water. No effect of the plate on falling movement is described, and it would appear that the appearance of the deflecting plate is anathema to an overall worm-like appearance for the lure.

In U.S Pat. No. 3,120,074 (Messler) there is disclosed a 23 worm-like lure having a sinker embedded in its head end. There is no life-like movement described or attributed to the sinker.

U.S. Pat. No. 3,017,716 (Hawks) discloses a multi-section worm-like lure in which the tail section is designed to wriggle as the lure is drawn through water. A weight secured externally of the lure serves as a conventional sinker. No mention is made of lure movement as it falls through water.

Numerous other patents describe prior art lures in which various weights and baffles are incorporated to effect different movements. These patents include U.S. Pat. Nos. 3,490,165 (Thomassin); 3,445,953 (Dailey); 2,290,433 (Jeffers); 3,344,549 (Peters); 2,690,026 (King); and 3,683,543 (Santosuosso). None of the described lures have the wriggling and squirming movement that is characteristic of a live worm falling in water. The King patent is of interest for its disclosure of a snake-like or eel-like lure with an embedded longitudinal wire pre-stressed to bias the lure into a normally serpentine pattern. A baffle secured at the tail provides drag as the lure is pulled through water so that the lure elongates and then returns to its biased serpentine configuration when the line is relaxed. Although the lure thusly alternates between serpentine and elongated states, there is no wriggling movement associated with the elongated state. In addition, there is no mention in the King patent of lure motion when the lure falls freely through water.

OBJECTS AND SUMMARY OF THE INVENTION

It is an object of the present invention to provide a fish lure having a close similarity to the appearance of a live annelid-type worm, which lure moves in the manner of a live worm when falling freely through water.

It is another object of the present invention to provide a realistic worm-like lure that moves in a manner that is characteristic of live worm movement when a fishing line attached to the head end of a lure is alternately pulled and relaxed.

In accordance with the present invention, a fish lure takes the form of a simulated earthworm or another annelid having a radially enlarged clitellum intermediate its ends. One or more weights are disposed in the clitellum below the central longitudinal axis of the lure to assure that the underside of the lure always faces downward when in water. In addition, the weighted clitellum assures that the lure, when falling through water, assumes the characteristic broad U-shape without twisting and tumbling as it falls. A paddle-like structure may be disposed at or proximate the tail end of the lure and is preferably oriented in a vertical plane and configured with more surface area below the central longitudinal axis of the lure than above the axis. A paddle thusly configured tends to assist the weighted clitellum in preventing the lure from tumbling and twisting. In addition, as the lure falls through water, the tail paddle responds to perturbations in the water, and to its own asymmetry, to cause a wriggling and squirming of the lure that is simulative of the wriggling and squirming observed in live free-falling worms. A depending lip secured proximate the front end of the lure is tilted toward the front end and imparts additional movement to the free-falling lure.

The depending forward lip may be replaced by a medusa-like collar having a configuration much like an umbrella with its open end facing rearwardly of the lure. When stationary the collar is amorphous, similar to an umbrella intermediate its open and closed positions. As the lure is pulled through water from its forward end by a fishing line, the collar tends to collapse radially inward and the lure elongates. The tail paddle prevents the lure from twisting as the elongated lure is thusly drawn through water. Importantly, the lure is prevented from spinning about its longitudinal axis by the off-center clitellum weights disposed at the lure underside. A pause in the pulling force causes the weighted clitellum to fall as its forward momentum decreases, thereby producing in the lure a U-shape similar to that attained as the lure falls freely. The downward component of the clitellum movement pulls the collar downwardly, thereby causing water trapped inside the collar to force the collar open to a generally conical shape. As the fishing line is alternately pulled and released, therefore, the collar alternately closes and opens and the lure alternately elongates and forms a U-shape. The collar thus simulates a breathing action while the overall lure wriggles.

BRIEF DESCRIPTION OF THE DRAWINGS

The aforesaid and other objects, features and advantages of the present invention will be appreciated more readily as they become better understood from a reading of the following description considered in connection with the accompanying drawings wherein like parts in the each of the several figures are identified by the same reference numerals and characters, and wherein:

FIG. 1 is a side view in elevation of an embodiment of a lure constructed in accordance with the principles of the present invention;

FIG. 2 is a top view in plan of the lure of FIG. 1;

FIG. 3 is a side view in elevation of a front end portion of a modified version of the lure of FIG. 1 in which a collar is employed, the collar being shown fully opened;

FIG. 4 is a view in transverse section taken along lines 4—4 of FIG. 3;

FIG. 5 is a view similar to FIG. 3 but wherein the collar is shown in its quiescent amorphous state;

FIG. 6 is a view similar to FIG. 3 but wherein the collar is shown in its closed state;

FIG. 7 is a diagrammatic illustration of the lure, modified with the collar of FIG. 3, shown while being pulled through water by a fishing line;

FIG. 8 is a diagrammatic illustration of the lure of FIG. 7 shown after tension in the fishing line has been removed;

FIG. 9 is a side view in elevation of a modified portion of the tail of the lure of FIG. 1;

FIG. 10 is a side view in elevation of another modified portion of the tail of the lure of FIG. 1;

FIG. 11 is a view in transverse section taken along lines 11—11 of FIG. 10.

DESCRIPTION OF THE PREFERRED EMBODIMENTS

Referring to FIGS. 1 and 2 of the accompanying drawings, a plastic lure 10 takes the form of a simulated bloodworm or earthworm, or other annelid sub-divided into a series of annular ridges 11 spaced by a series of intervening segments 12 of lesser diameter and length. A simulated clitellum 13 serves to longitudinally separate the lure into a forward section 14 and a rearward section 15, the latter being the slightly longer of the two. Clitellum 13 is axially longer than annular ridges 11, typically extending to a length of three to ten times the ridge length. The diameter of the clitellum 13 may be the same as that of adjacent annular ridges 11 but is typically two to six times greater than that of the annular ridges 11 and is off-center with respect to the longitudinal axis or centerline A of the series of ridges. In this regard the clitellum projects radially to a much greater extent from the underside of the lure than from the transverse sides and top of the lure.

One or more weights 20 are disposed interiorly of clitellum 13 such that most of the mass of the weights are disposed below the longitudinal axis A. Weights 20 ar typically beads of plastic, lead or other material of greater density than the lure material, and they function, by virtue of their off-axis positioning, to force the underside of the lure to face downward when the lure falls or is drawn through body of water.

The distal end of rearward section 15 terminates in a tail paddle 21 having oppositely facing broad surfaces 22, 23 circumscribed by a peripheral edge 24 joined to rearward section 15 of the lure. In the preferred embodiment of the present invention, paddle 21 is oriented such that, when the underside of the lure 10 faces downward, surfaces 22 and 23 are in respective vertical planes. In this orientation the tail paddle is positioned much like a rudder. The tail paddle is off-center with respect to longitudinal axis A in that more surface area of surfaces 22 and 23 is disposed below axis A than above that axis. With this configuration the tail paddle functions to cause the lure to wriggle and squirm from side-to-side as the lure falls through the water. The wriggling action results from slight asymmetries in the paddle that respond to small currents in the water that produce a net force imbalance tending to deflect the paddle to one side or the other. The deflection is immediately opposed as the differential hydrodynamic forces across the paddle reverse polarity when the paddle moves to one side. More specifically, as the lure falls through water, the weighted clitellum 13 is at a lower level than the ends of the lure. Paddle 21, therefore, is slightly tilted such that rearward section 15 extends upwardly as well as rearwardly from the clitellum. Tail paddle 21, therefore, is tilted with its proximal end below its distal end. The water through which the lure falls produces hydrodynamic forces on the surfaces 22 and 23 as the water flows past those surfaces. As the tail paddle deflects to one side (e.g., the side of surface 22), the hydrodynamic forces on that side increase while the hydrodynamic forces on the opposite side decrease. As a consequence, the initial deflection is opposed by a counter deflection and the resilient elasticity of the material, causing the tail paddle to deflect to the opposite side. The counter deflection is similarly opposed, resulting in a periodic back and forth deflection (i.e., wriggling) movement in the lure as it falls in a body of water.

When the lure is drawn through water by a fishing line that is alternately pulled taut and relaxed, tail paddle 21 resists any tendency of the lure to twist about axis A and thereby assists weights 20 in maintaining the lure in its desire orientation in which the underside of the lure faces downward.

A depending front paddle or lip 25 is secured to the underside of the lure at a location spaced a short distance from the forward end. Depending lip 25 is generally elliptical with the proximal end of its long dimension secured to the lure. The forward-facing surface of the lip is tilted forward, typically at an angle of 45° or greater, such that the distal end of the lip is more forwardly positioned than the proximal end. The function of the front lip is to cause the lure to wriggle side-to-side relative to axis A as the lure drops or is drawn through the water at the end of the fishing line attached to the forward end of the lure.

A fishing hook 26 is embedded in forward section 14 of the lure at the head end in a conventional manner.

Lure 10, including tail paddle 21, forward lip 25 and clitellum 13, is integrally molded as one piece from a suitable plastic material Weights 20 are placed in the mold before curing, it being understood that the mold is oriented such that the underside of the molded lure faces downward in the mold so that weights 20 are able to be properly positioned in the lure by gravitional forces. The finished plastic material is the same as that conventionally used for worm-like plastic lures and is typically soft, flexible and elastic, and feels to the touch much like a worm. Typical materials, in this regard, are polyvinyl chloride, polyethylene, etc.

The overall length of the lure is similar to that of a typical earthworm or bloodworm and, for example, is on the order of six to nine inches. The clitellum is generally on the order of three-quarters of an inch long with a diameter of approximately one-half inch. Annuli 11 vary in size along the length of the lure in a manner to simulate the annuli size variations in an actual worm. For example, the largest annuli at the forward end of the lure are typically five-sixteenths of an inch in diameter and three-eighths of an inch in length; the smallest annuli at the rearward end are typically on the order of three-sixteenths of an inch in diameter and three-sixteenths of an inch in length.

The length of tail paddle 21 (i.e., in a direction of axis A) is typically in the range of 0.1 to 0.25 times the overall lure length. The width of the tail paddle (i.e., vertically along surfaces 22, 23) is typically in the range of one to three times the diameter of the largest annulus 11. The thickness of the tail paddle is typically 0.5 to one times the diameter of the smallest annulus 11.

Forward paddle or lip 25 typically has a length and width between one and three times the largest annulus diameter, and a thickness similar to that of the tail paddle 21. The spacing of forward lip 25 from the front end of the lure is generally less than fifteen percent of the lure length, and is preferably five percent of that length.

Clitellum 13 is preferably, but not necessarily, located in the forward half of the length of the lure; typically, the rearward end of the clitellum is located approximately at the longitudinal center of the lure. In any event, if the length of the lure is subdivided into quarters of equal length, clitellum 13 should be located somewhere in the middle two quarters. The total weight provided by weights 20 is selected in accordance with different types of fishing situations. For example, the total weight may be smaller for shallow water fishing than for deep water fishing.

In an alternative embodiment of the present invention, the forward lip or paddle 25 is replaced by a medusa-like collar 30 as illustrated in FIGS. 3, 4, 5 and 6. Collar 30 is secured to the lure symmetrically and concentrically about axis A at a location forward of the clitellum. Formed either as an integral part of the molded plastic lure or as a separate attachment, collar 30 includes a plurality of angularly spaced ribs 31 extending radially outward and rearward from the location at which the collar is joined to the lure body. Thin membrane-like and generally triangular webs 32 join adjacent ribs 31 and extend a short radial distance beyond the distal ends of the ribs to define respective angularly-spaced flaps 33, the spacing between the flaps corresponding to the angular width of the ribs. When the lure is substantially stationary, the membrane-like webs 32 cause the collar to be in an amorphous, partly open, partly closed condition, as illustrated in FIG. 5, wherein the webs 32 are free to flutter slightly with random turbulence in the surrounding water.

As the modified lure falls through the water, collar 30 tends to be forced open. Specifically, as described above and as illustrated in FIG. 8, the weighted clitellum forces the lure to assume a generally U-shape such that the collar is pulled downwardly and rearwardly. Water trapped within the thusly pulled collar forces the collar to its fully opened condition, wherein it assumes a generally conical shape, as illustrated in FIGS. 3 and 8. On the other hand, as the lure is drawn through water by a fishing line attached to its head end, the collar tends to radially close, as illustrated in FIGS. 6 and 7, in a manner similar to that of an umbrella; that is, ribs 31 bend radially inward about their proximal ends while the webs 32 collapse against the lure body. More specifically, the collar is forced radially closed about the elongated lure by the hydrodynamic forces exerted by the surrounding water on the outer surfaces of webs 32 as the lure moves in a forward direction. If the tension on the fishing line is now relaxed, the hydrodynamic forces acting on the outside surface of the ribs are removed, and the lure has a tendency to sink. However, the momentum of the weights 20 in clitellum 13 tends to continue the forward movement of the clitellum. The net effect is to cause the previously elongated lure to assume a generally U-shaped configuration, as illustrated in FIG. 8. The weighted clitellum 13 thus pulls backward on the collar 30 which is forced open by the water entrapped therein. The open conical collar thus opposes the overall falling movement of the lure. Thus, during the pause in applied tension on the fishing line, the lure collapses to its broad U-shape but there is minimal fall experienced by the head end due to the open collar 30. When tension is restored on the fishing line, whereby to pull the lure through the water, the lure elongates and the collar is collapsed again by the hydrodynamic forces exerted by the surrounding water. The resulting alternating elongation and collapse of the lure, without significant dropping, is closely simulative of the movements of a worm or worm-like organism swimming in a forward direction through water.

Ribs 31 impart sufficient flexural strength to collar 30 to prevent the collar from inverting to a position wherein its open end faces forwardly of the lure. Any number of ribs 31 may be provided as required to serve this function. The ribs may be eliminated if inversion is otherwise prevented. For example, the collar material at and near the lure body may be much thicker than the membrane-thin remainder of the collar at its outer periphery and intermediate regions. The thicker material immediately surrounding the lure body may be molded so as to be biased rearwardly as necessary to preclude inversion of the collar.

Flaps 33 are provided to impart a slight fluttering effect in response to water currents, thereby enhancing the simulated breathing movements associated with the collar.

The tail paddle may assume any of a variety of configurations and is not limited to the generally rectangular configuration of tail paddle 21. For example, tail paddle 50 illustrated in FIG. 9, is an irregular eclipse. As with tail paddle 21, paddle 50 is vertically-oriented and has more of its surface area disposed below than above axis A. In fact, it is within the scope of the present invention to configure the tail paddles 21 and 50 such that substantially all of the paddle is disposed below the axis. With these considerations in mind the paddle can be circular, polygonal, or any other desired configuration.

Although the tail paddle is most effective for the functions described when oriented vertically and coplanar with axis A, other orientations are possible For example, tail paddle 60, illustrated in FIGS. 6 and 7, depends vertically downward from the tail end of the lure at right angles to axis A. Paddle 60 diverges in a direction away from the lure so as to be wider at its bottom than at its top. Although paddle 60, like paddles 21 and 50, resides in a vertical plane, paddle 60 is turned at right angles to axis A so that its length and width extend transversely of the axis. Paddles 21 and 50, on the other hand, have their lengths extending parallel to axis A with only their widths extending transversely of the axis. A lure configured with paddle 60, therefore, experiences up and down wriggling, as well as to side-to-side wriggling, as it falls through a body of water. In addition, paddle 60 imparts the same or similar movement to the lure as it is pulled forwardly through water.

The plastic material from which the lure is molded is typically less dense than water or, in some cases, of a density similar or slightly greater to that of water. In the case of material that is less dense than water, in the absence of weights 20 the lure would remain floating on the surface of the body of water. In the case of material that is the same density or slightly greater as water, the lure would tend to be suspended at some depth or sink slowly and move in accordance with currents in the body of water. The weights 20, on the other hand, cause the lure to fall in the body of water in a configuration wherein the weighted clitellum 13 is positioned below the two ends of the lure (i.e., in a broad U-shaped configuration).

Tail paddle 21 typically has twice as much area below axis A as above and, in a typical embodiment, the paddle is one millimeter thick.

From the foregoing description it will be appreciated that the invention make available a novel fish lure wherein the lure moves in a life-like manner characteristic of earthworms, bloodworms and other annelids when falling in a body of water and while being pulled forwardly by a fishing line that is alternately taut and relaxed.

Having described preferred embodiments of a new and improved life-like fish lure in accordance with the present invention, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed:

1. A fish lure comprising an elongated annelid-simulating body of soft and flexible plastic material with a central longitudinal axis, said body having a head end, a tail end and a radially enlarged simulated clitellum disposed spaced from said head and tail ends, said clitellum being weighted to cause the lure to fall through a body of water in an orientation where the clitellum is below the head and tail ends.

2. The fish lure according to claim 1 wherein said lure has a defined underside, and wherein the clitellum is more heavily weighted at the underside of the lure than at any other part of the lure periphery.

3. The fish lure according to claim 2 wherein said tail takes the form of a tail paddle and is asymmetrically oriented with respect to said axis such that more of said paddle extends toward the underside of said lure than in any other radial direction from said axis.

4. The fish lure according to claim 3 wherein said tail paddle includes two opposite paddle surfaces extending substantially parallel to said axis.

5. The fish lure according to claim 3 wherein said tail paddle includes two opposite paddle surfaces extending substantially perpendicular to said axis.

6. The fish lure according to claim 3 wherein a depending lip member is disposed proximate but spaced from said head end, said lip member extending downwardly at an angle toward the head end of said lure from the underside thereof.

7. The fish lure according to claim 3 further comprising a collar surrounding said lure at a location forward of said clitellum, said collar having a medusa-like appearance and extending radially outward and rearward of said location.

8. The fish lure according to claim 2 wherein the clitellum is weighted by weighing means disposed in the clitellum at a location off-center with respect to said axis in direction toward the underside of the lure.

9. The fish lure according to claim 8 wherein said body, including said clitellum, is a one piece molded member, and wherein said weighing means comprises at least one insert disposed in said clitellum and surrounded by said plastic material, said insert having a density substantially greater than the density of said plastic material.

10. The fish lure according to claim 9 wherein said tail end is in the form of a tail paddle constituting part of said one piece molded member, said tail paddle being asymmetrically oriented with respect to said axis such that more of said paddle extends toward the underside of said lure than in any other radial direction from said axis.

11. The fish lure according to claim 10 wherein said tail paddle includes two opposite paddle surfaces extending substantially parallel to said axis.

12. The fish lure according to claim 10 wherein said tail paddle includes two opposite paddle surfaces extending substantially perpendicular to said axis.

13. The fish lure according to claim 10 wherein a depending lip member is disposed proximate but spaced from said head end as part of said one piece molded member, said lip member extending downwardly at an angle toward the head end of said lure from the underside of said lure.

14. The fish lure according to claim 10 further comprising a collar surrounding said lure at a location forward of said clitellum, said collar having a medusa-like appearance and extending radially outward and rearward of said location, said collar being forced to a generally conical open position by trapped water when the lure experiences rearward pulling forces and to a closed position in response to hydrodynamic forces applied to the outer surface of the collar as said lure is pulled from said head end through a body of water.

15. The fish lure according to claim 14 wherein said collar is part of said one piece molded member and includes multiple angularly-spaced thin flaps at its radially outer edge.

16. The fish lure according to claim 14 wherein collar and said molded member are separate one piece components.

17. The fish lure according to claim 14 wherein said collar comprises a plurality of angularly spaced ribs extending outwardly and rearwardly from said bottom, and a plurality of membrane-like webs disposed between respective angularly-adjacent pairs of said ribs.

18. The fish lure according to claim 1 wherein a depending lip member is disposed proximate but spaced from said head end, said lip member extending downwardly at an angle toward the head end of said lure from the underside thereof.

19. The fish lure according to claim 1 further comprising a collar surrounding said lure at a location forward of said clitellum, said collar having a medusa-like appearance and extending radially outward and rearward of said location.

20. The fish lure according to claim 19 wherein said collar has an amorphous state in the absence of a significant differential pressure across its inside and outside surfaces.

21. The fish lure according to claim 20 wherein said collar includes means, responsive to higher pressure at its forwardfacing surface than its rearward facing surface, for radially collapsing said collar against said elongated body, said means also being responsive to higher pressure at its rearward-facing surface than its forward facing surface for opening the collar to a generally conical configuration.

22. The fish lure according to claim 21 wherein said collar is part of said one piece molded member and includes multiple angularly-spaced thin flaps at its radially outer edge.

23. The fish lure according to claim 21 wherein said collar and said elongated lure body are separate pieces.

24. The fish lure according to claim 22 wherein said collar comprises a plurality of angularly spaced ribs extending outwardly and rearwardly from said bottom, and a plurality of membrane-like webs disposed between respective angularly-adjacent pairs of said ribs.

25. The fish lure according to claim 1 further comprising a collar surrounding said lure at a location forward of said clitellum, said collar having a medusa-like appearance and extending radially outward and rearward of said location.

26. The fish lure according to claim 25 wherein said collar has an amorphous state in the absence of a significant differential pressure across its inside and outside surfaces.

27. The fish lure according to claim 26 wherein said collar includes means, responsive to higher pressure at its forward-facing surface than its rearward facing surface, for radially collapsing said collar against said elongated body, said means also being responsive to higher pressure at its rearward-facing surface than its forward facing surface for opening the collar to a generally conical configuration.

28. The fish lure according to claim 26 wherein said collar comprises a plurality of angularly spaced ribs extending outwardly and rearwardly from said bottom, and a plurality of membrane-like webs disposed between respective angularly-adjacent pairs of said ribs.

* * * * *